Patented Mar. 24, 1931

1,797,250

UNITED STATES PATENT OFFICE

DOUGLAS FRANK TWISS AND EDWARD ARTHUR MURPHY, OF BIRMINGHAM, ENGLAND, ASSIGNORS TO DUNLOP RUBBER COMPANY LIMITED, A BRITISH COMPANY

IMPROVED PROCESS FOR MANUFACTURING TRANSPARENT VULCANIZED RUBBER

No Drawing. Application filed October 2, 1928, Serial No. 309,888, and in Great Britain October 5, 1927.

This invention relates to an improved process for manufacturing transparent vulcanized rubber.

As is known the use of zinc oxide or alternative zinc compounds has been necessary with all ultra accelerators including those of the zinc salt type such as a zinc dialkyldithiocarbamate, zinc piperidine carbothionolate

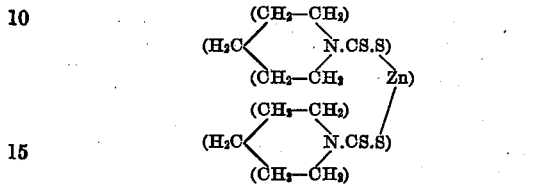

or a zinc alkyl-xanthate.

According to this invention transparent vulcanized rubber can be obtained without using zinc oxide or other zinc activators such as zinc oleate if an ultra accelerator of the zinc salt type examples of which have been given above) is added to natural latex (which if desired may have been freed from part of its serum constituents by dialysis and/or by creaming and/or by centrifuging), in conjunction with sulphur and if desired such stabilizers and softening agents as are substantially soluble in the rubber hydrocarbon or otherwise are removable in a final alkali and/or water treatment as hereinafter indicated.

The compounded mixtures may be concentrated if desired before deposition is effected by known operations such as dipping, spreading, coat, moulding, extrusion, chemical deposition or electrophoretical deposition.

Concentrates compounded as above can be obtained according to the process described and claimed in specification No. 232,705 and these are specially suitable for obtaining transparent vulcanized rubber or rubber goods.

The results obtained were quite unexpected because if sulphur and for example zinc diethyldithiocarbamate are mixed with dry rubber in the usual way vulcanization is inappreciable unless the time and temperature employed for the vulcanization are considerably in excess of those commonly associated with the use of an ultra accelerator, in which case darkening and discolouration of the rubber occurs.

The type of transparent rubber described above may be vulcanized in boiling water. Hence a minimum of discolouration due to heating the rubber is obtained. If the rubber deposit is set by means of a dehydrating solution as described in co-pending application Serial No. 309,353 filed Sept. 29, 1928, and vulcanized in boiling water or in a heated aqueous solution as for example the aforementioned dehydrating solution, the vulcanized film after treatment in a boiling caustic soda solution with subsequent washing and drying results in a transparent and almost colourless product.

If an amber coloured transparent rubber is desired the deposit which may have been set and partly dehydrated as described above is dried and partially vulcanized by dry heat, as for example 15 to 20 minutes at 100° C. A subsequent treatment in caustic soda solution to remove accelerator and any free sulphur and stabilizers will not cause the loss of colour as after the initial dry heat treatment the colouring constituents of the rubber are insoluble.

With either type of product treatment in a 10% boiling caustic soda solution removes not only any free sulphur but also nearly all the accelerator. For example a mixing containing 0.75% zinc diethyldithiocarbamate after vulcanization and subsequent treatment for 20 minutes in boiling 10% caustic soda contained only 0.009% zinc.

According to the invention practically pure heat cured transparent rubber is thus obtained which is particularly suitable for the manufacture of such articles as teats, surgical tubings and surgeons' gloves, etc.

A further advantage held by a vulcanisate obtained in the above manner is that apparently owing to the absence of any solid particles it has high tensile strength and extensibility and exceptionally low permanent set.

The following example serves to illustrate how the process is carried into effect.

A mixing of 96.75 parts of rubber in latex form, 2.50 parts of sulphur, 0.75 parts of zinc diethyldiethiocarbamate, 0.3 part of oleic acid, 0.2 part of casein, and 0.7 of potassium hydroxide is concentrated according to specification No. 232,705 until it contains 75% total solids. On depositing a portion of the creamy product in layers on a shaped foundation and then drying and vulcanizing the same in boiling water for 35 minutes, a highly transparent very elastic and strong product is obtained.

If the deposition is effected by dipping, the operation may be repeated as many times as required.

If desired also the deposit may be immersed in a heated solution of a salt such as calcium chloride or ammonium acetate before drying is completed and/or before vulcanization is effected. When repeated dipping is employed the immersion may be effected between the respective dippings, the deposits being washed with water if required before being again dipped.

Examples of further mixings which may be used are as follows:

(1) A mixing was made up to contain:—

| | |
|---|---|
| Rubber (as latex) | 92.00 |
| Sulphur | 2.50 |
| Zinc diethyldithiocarbamate | 0.5 |
| Paraffin oil | 5.00 |
| Casein | 0.20 |
| Oleic acid | 0.30 |
| Caustic potash | 0.4 |

In this case the latex employed was concentrated by centrifuging before compounding. No further concentration was given. Total solids 50%.

(2) A mixture was made up to contain:—

| | |
|---|---|
| Rubber (as latex) | 86.75 |
| Sulphur | 2.0 |
| Zinc piperidinecarbothionolate | 0.75 |
| Transformer oil | 10.0 |
| Oleic acid | 0.2 |
| Caustic potash | 0.3 |

The mixture was concentrated until it contained 70-75% of total solids.

(3) A mixture was made up to contain:—

| | |
|---|---|
| Rubber (as latex) | 92.0 |
| Sulphur | 2.0 |
| Zinc diethyldithiocarbamate | 1.0 |
| Paraffin oil | 5.0 |
| Oleic acid | 0.1 |
| Casein | 0.1 |
| Caustic potash | 0.1 |

The compounding ingredients were dispersed in a solution of the oleic acid and casein in alkali then added to ordinary ammonia-preserved latex without subsequent concentration.

What we claim is:—

1. A process for the manufacture of transparent vulcanized rubber, which consists in forming deposits or products directly from a mixing of rubber latex, sulphur and an ultra accelerator of vulcanization of the zinc salt type said mixing being devoid of zinc oxide and vulcanizing the products.

2. A process for the manufacture of transparent vulcanized rubber, which consists in forming deposits or products directly from a mixing consisting of rubber latex, sulphur, an ultra accelerator of vulcanization of the zinc salt type and compounding ingredients which are substantially soluble subsequent to deposition said mixing being devoid of zinc oxide, and in vulcanizing the deposits.

3. A process as claimed in claim 1, wherein the latex of the mixing is in concentrated condition.

4. A process as claimed in claim 1, wherein the mixings are concentrated before the deposits are formed.

5. A process as claimed in claim 1, wherein the latex is freed from part of its serum constituents prior to being compounded.

6. A process as claimed in claim 1 wherein the compounding ingredients include softeners such as oleic acid.

7. A process as claimed in claim 1 wherein the vulcanized deposits or products are subjected to treatment with hot alkali solution.

8. A process according to claim 1 wherein the ultra accelerator of vulcanization of the zinc salt type is zinc piperidine carbothionolate

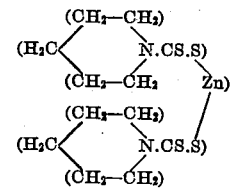

9. A process according to claim 1 wherein the deposits or products are obtained by dipping.

10. The process according to claim 1 wherein the vulcanization is effected in boiling water.

11. The process according to claim 1 wherein the vulcanization is effected partially by dry heat.

12. The process according to claim 1 wherein the deposit is dried prior to vulcanization.

13. The process according to claim 1 wherein the deposit is immersed in a solution of a salt and then dried.

14. The process according to claim 1 wherein the deposits are obtained by dipping and wherein between the respective dippings the deposit is immersed in a salt.

15. A process as claimed in claim 1 wherein transparent vulcanized rubber is obtained from rubber latex having admixed therein an ultra accelerator of the zinc salt type in the absence of a zinc activator.

16. A process as claimed in claim 1 wherein the combined ingredients include stabilizers.

17. A process as claimed in claim 1 wherein the combined ingredients include softeners and stabilizers.

18. A process for the manufacture of transparent vulcanized rubber which comprises vulcanizing a mixture of rubber latex, sulphur and an ultra-accelerator of vulcanization of the zinc salt type, said mixings being devoid of zinc oxide, and vulcanizing the products at a temperature not exceeding 100° C.

19. A process for the manufacture of transparent vulcanized rubber which comprises vulcanizing a mixture of rubber latex, sulphur and an ultra-accelerator of vulcanization of the zinc salt type, said mixings being devoid of zinc oxide, vulcanizing the products at a low temperature not exceeding 100° C., and removing ingredients insoluble in rubber with hot alkaline solution.

20. A process for the manufacture of transparent vulcanized rubber which comprises vulcanizing a mixture of rubber latex, sulphur and an ultra-accelerator of vulcanization of the zinc salt type, said mixture being devoid of zinc oxide, vulcanizing the products at a low temperature not exceeding 100° C., and removing ingredients insoluble in rubber with boiling water.

21. A process for the manufacture of transparent vulcanized rubber which consists in concentrating a mixture of rubber latex, sulphur and an ultra- accelerator of vulcanization of the zinc salt type, said mixture being devoid of zinc oxide and vulcanizing the mixture at a temperature not exceeding 100° C.

22. A transparent vulcanized rubber article having an accelerator of the zinc salt type and being devoid of zinc oxide or opaque pigments.

In witness whereof we have hereunto signed our names.

DOUGLAS FRANK TWISS.
EDWARD ARTHUR MURPHY.